United States Patent Office 3,055,917
Patented Sept. 25, 1962

3,055,917
4-ANDROSTENE-3,11,17-TRIONE 17-OXIME AND INTERMEDIATES THEREFOR
Wataru Nagata, Nishinomiya-shi, Masayuki Narisada, Shimogamo, Sakyo-ku, Kyoto-shi, and Tsutomu Sugasawa, Higashinada-ku, Kobi-shi, Japan, assignors to Shionogi & Co., Ltd.
No Drawing. Filed Apr. 30, 1962, Ser. No. 191,303
Claims priority, application Japan Dec. 12, 1961
3 Claims. (Cl. 260—397.3)

This invention relates to 4-androstene-3,11,17-trione 17-oxime represented by the formula:

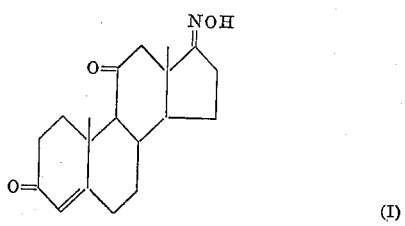

(I)

It is an object of the present invention to provide 4-androstene-3,11,17-trione 17-oxime. Another object is the provision of a steroid having pharmacological activities. Other objects will be apparent to those skilled in the art to which this invention pertains.

The objective 17-oxime I, 4-androstene-3,11,17-trione 17-oxime, can be obtained by subjecting substantially the starting 17-ketone II, 4-androstene-3,11,17-trione (adrenosterone), to the oxime-formation reaction. However, it is difficult to convert the 17-ketone II into the 17-oxime I by one step according to the ordinary oxime-formation procedure, because the 3-oxo radical in the 17-ketone II is more reactive than the 17-oxo radical and changes to the hydroxyimino radical prior to the conversion of the latter. In the present invention, the object is attained by subjecting the starting 17-ketone II to the oxime-formation reaction with the previous protection of the 3-oxo radical and the subsequent elimination of the protecting group at 3-position. Thus, the object of the present invention can be accomplished by protecting the 3-oxo radical in the 17-ketone II as the enol ether group, subjecting the resulting enol ether III to the oxime-formation reaction at 17-position and eliminating the protecting group at 3-position of the resultant enol ether 17-oxime IV to afford the 17-oxime I.

The process of the present invention may be represented by the following scheme:

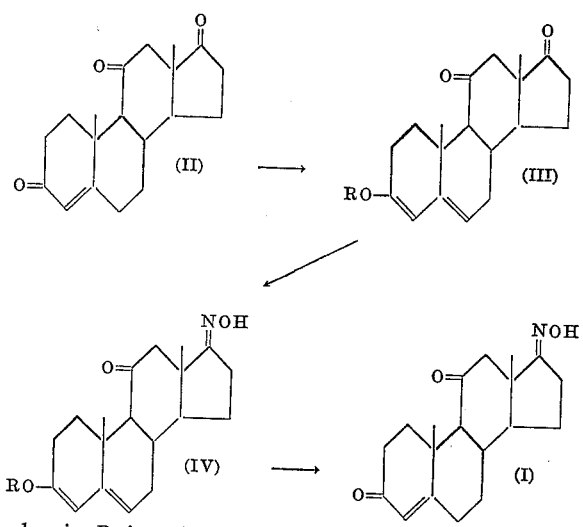

wherein R is a lower alkyl radical, preferably having from one to ten carbon atoms (e.g. methyl, ethyl, propyl, butyl, pentyl, octyl, etc.).

The starting 17-ketone II, 4-androstene-3,11,17-trione (adrenosterone), is a well known compound as Reichstein's substance G.

Firstly, the 17-ketone II is subjected to the protection of the 3-oxo radical as an enol ether group. The reaction may be carried out by heating the 17-ketone II with a lower alkanol (e.g. methanol, ethanol, propanol, butanol, etc.) in the presence of an acidic catalyst. For instance, the reaction can be preferably performed by heating the 17-ketone II with a lower alkanol in the presence of an acidic salt and an orthoformic ester.

Secondly, the thus-obtained enol ether III is subjected to the oxime-formation on the 17-oxo radical. The reaction may be carried out by heating the enol ether III with hydroxylamine. A buffer solution or a salt may be present for executing the reaction under such a mild condition that the enol ether group is not affected.

Thirdly, the resultant enol ether 17-oxime IV is subjected to the elimination of the protecting enol ether group at 3-position. The reaction may be executed in a conventional hydrolyzing procedure under a relatively mild condition for avoiding the elimination of the hydroxyimino radical. Thus, the reaction may be preferably carried out by treating the enol ether 17-oxime IV with an acid at a lower temperature or with a weak acid.

The thus-prepared 17-oxime I, 4-androstene-3,11,17-trione 17-oxime, is useful as an anti-estrogenic agent. For instance, the oral administration of the 17-oxime I at a dose of 3 milligrams per mouse weighing from 8 to 10 grams produced the significant inhibition of uterine growth induced by 0.03 microgram of 1,3,5-estratriene-3,17β-diol (estradiol). It is also useful as an anti-DOCA (desoxycorticosterone acetate) agent. For instance, the subcutaneous administration of the 17-oxime I at a dose of 5 milligrams per rat weighing from 140 to 160 grams resulted in the significant inhibition of the response caused by 10 micrograms of DOCA.

The following examples set forth illustratively presently-preferred embodiments of the invention.

*Example 1*

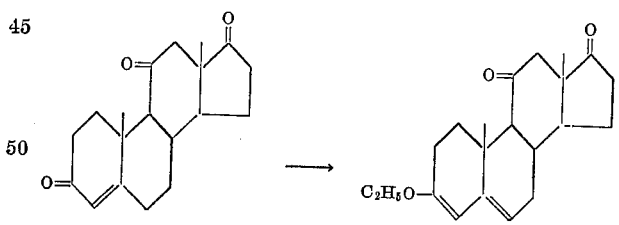

To a solution of 4-androstene-3,11,17-trione (1 g.) in a mixture of anhydrous benzene (25 ml.), anhydrous ethanol (2.5 ml.) and ethyl orothformate (3 ml.), there is added pyridine hydrochloride (48 mg.), and the resultant solution is mildly refluxed for 13 minutes. After cooling, the reaction mixture is poured into an aqueous solution of sodium carbonate cooled with ice. The aqueous layer is extracted twice with benzene. The benzene layer and the benzene extracts are combined together, washed with water, dried over anhydrous sodium sulfate and evaporated to dryness. The crystalline residue (1.201 g.) is recrystallized from acetone-hexane to afford 3-ethoxy-3,5-androstadiene-11,17-dione as crystals (783 mg.). M.P. 145 to 155° C. (recrystallized from acetone). $[\alpha]_D^{29}$ +15.0±2° (CHCl$_3$).

$\lambda_{max}^{ethanol}$ 241.5 mμ (ε:19,500). $\nu_{max}^{chloroform}$ 1743, 1711 cm.$^{-1}$ Anal. Calcd. for C$_{21}$H$_{28}$C$_3$: C, 76.79; H, 8.59. Found: C, 6.66; H, 8.68.

Example 2

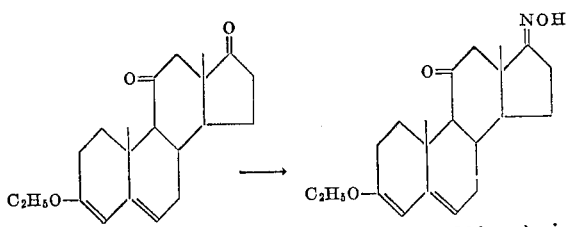

3-ethoxy-3,5-androstadiene-11,17-dione (2.932 g.) is added to a solution of hydroxylamine prepared from hydroxylamine hydrochloride (3 g.), sodium acetate (6 g.) and 95% ethanol (150 ml.), and the resultant solution is refluxed for 10 minutes. The reaction mixture is concentrated under a reduced pressure. Adding water to the residue, the crystallized needles (2.989 g.) are collected by filtration. Recrystallization of the crystals from dichloromethane-95% ethanol affords 3-ethoxy-3,5-androstadiene-11,17-dione 17-oxime (2.194 g.). M.P. 187 to 190° C. (decomp.). $[\alpha]_D^{33} -116.5 \pm 2°$ (CHCl$_3$).

$\lambda_{max.}^{ethanol}$ 241.5 m$\mu$ ($\epsilon$:20,100). $\nu_{max.}^{Nujol}$ 3359, 1691, 1650, 1629 cm.$^{-1}$ Anal. Calcd. for $C_{21}H_{29}O_3N$: C, 73.43; H, 8.51; N, 4.08. Found: C, 73.64; H, 8.64; N, 3.93.

Example 3

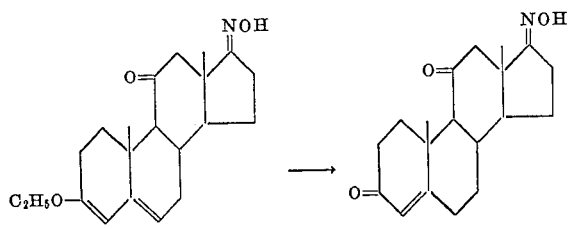

To a solution of 3-ethoxy-3,5-androstadiene-11,17-dione 17-oxime (2.120 g.) in 95% ethanol (212 ml.), there is added perchloric acid (2.12 g.), and the resultant solution is allowed to stand overnight in a refrigerator (0° C.). The reaction mixture is neutralized with pyridine (3 ml.) and concentrated under a reduced pressure. To the residue, there is added water, and the resulting mixture is extracted with chloroform. The chloroform extract is washed with an aqueous solution of sodium carbonate and then water, dried over anhydrous sodium sulfate and evaporated to dryness. The crystalline residue is washed with ether to afford crude crystals (1.809 g.). Recrystallization of the crystals from acetone affords 4-androstene-3,11,17-trione 17-oxime as pillars. M.P. 250.5 to 252° C. (decomp.). $[\alpha]_D^{33} +158.7 \pm 3°$ (CHCl$_3$).

$\lambda_{max.}^{ethanol}$ 238.5 m$\mu$ ($\epsilon$:14,500). $\nu_{max.}^{Nujol}$ 3469, 1692, 1659 cm.$^{-}$ Anal. Calcd. for $C_{19}H_{25}O_3N$: C, 72.35; H, 7.99; N, 4.44. Found: C, 72.69; H, 8.15; N, 4.54.

4-androstene-3,11,17-trione 17-oxime thus prepared is useful as an anti-estrogenic agent and an anti-DOCA agent. Additionally, it may be noted that this compound shows a longer anesthetic action than commercially available anesthetics, hydroxydione sodium (21-hydroxy-pregnane-3,20-dione sodium hemisuccinate), cyclobarbital calcium (calcium 5-(1-cyclohexenyl)-5-ethylbarbiturate) and thiopental sodium (sodium 5-ethyl-5-(1-methylbutyl)-2-thiobarbiturate) in the test using mice.

What we claim is:
1. 4-androstene-3,11,17-trione 17-oxime.
2. 3-(lower)alkoxy-3,5-androstadiene-11,17-dione 17-oxime.
3. 3-ethoxy-3,5-androstadiene-11,17-dione 17-oxime.

No references cited.